United States Patent [19]

Weissman et al.

[11] 4,165,714

[45] Aug. 28, 1979

[54] ANIMAL HANDLING SYSTEMS

[76] Inventors: Jerry Weissman, Pumphouse Rd., Brewster, N.Y. 10509; Ely Kass, 26 Kings Ridge Rd., Mahopac, N.Y. 10541

[21] Appl. No.: 847,411

[22] Filed: Oct. 31, 1977

[51] Int. Cl.² .................. A01K 29/00; A61D 11/00
[52] U.S. Cl. .................................................... 119/158
[58] Field of Search ...................... 119/29, 156, 158

[56] References Cited

U.S. PATENT DOCUMENTS

| 2,611,341 | 9/1952 | Paris | 119/158 |
|---|---|---|---|
| 2,661,865 | 12/1953 | Wendt | 220/93 |
| 2,848,977 | 8/1958 | Prestrud et. al. | 119/158 |
| 3,543,725 | 12/1970 | Kirkpatrick et al. | 119/158 X |
| 3,598,088 | 8/1971 | Bowman et al. | 119/158 |
| 3,835,815 | 9/1974 | Matthews | 119/158 |
| 4,047,522 | 9/1977 | Plugge | 128/66 |

FOREIGN PATENT DOCUMENTS 1388676  3/1975  United Kingdom ..................... 119/158

Primary Examiner—Russell R. Kinsey
Assistant Examiner—Robert P. Swiatek
Attorney, Agent, or Firm—Mattern, Ware, Davis & Stoltz

[57] ABSTRACT

An animal handling system incorporating in one embodiment a vertically movable platform connected by cables to a drive mechanism for lowering an animal into a pool of water. In another aspect, a hydrotherapeutic apparatus for horses comprises a horse accommodating tank having anatomically positioned whirlpool hot water/air injection nozzle jets for administering hydrotherapeutic treatment. The animal is preferably lowered directly into the tank, and the vertically movable platform is combined with the hydrotherapy tank for this purpose.

12 Claims, 7 Drawing Figures

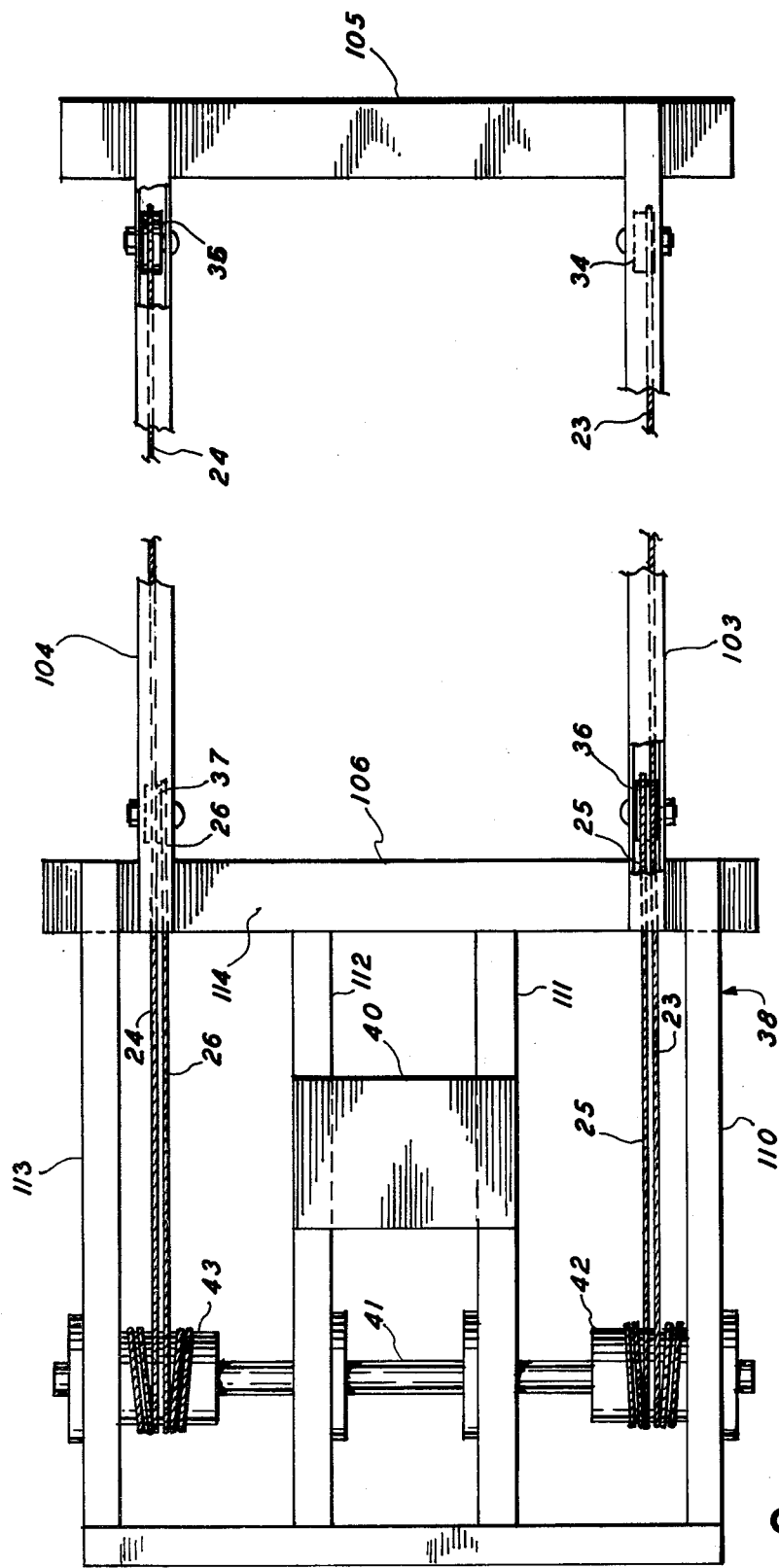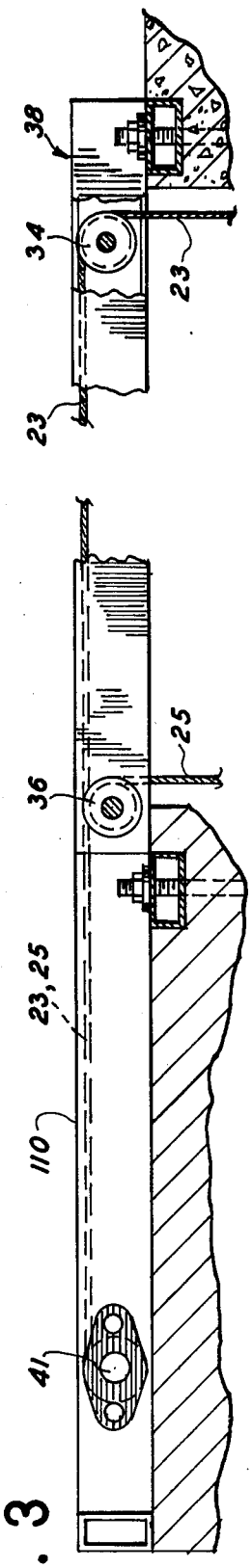
FIG. 2
FIG. 3

ANIMAL HANDLING SYSTEMS

SUMMARY OF THE INVENTION

This invention relates to animal handling and treatment systems and more particularly to submersible elevators adaptable for use in hydrotherapeutic treament.

The use of hydrotherapy in the care and treatment of animals and in particular racehorses is becoming quite common in order to help avoid injury and also to prolong the racing life of the horse. It has been found to be quite beneficial for a horse to be submerged in a tank of warm water while its muscles are being massaged by jets of water. Substantial benefit and enjoyment is also provided an animal in being able to walk or swim in a pool of water. One major difficulty presented in this technique, however, is the manner in which a horse enters and leaves the tank or pool. Other methods including swimming pool ramps require a large quantity of water to fill the tank, and a large amount of energy to heat the water. The present invention utilizes an elevator-type mechanism to lower and raise the animal in and out of the tank or pool. This allows the apparatus to be built with a much smaller space requirement.

Nothing in the prior art suggests the concept of the present invention. Matthews, U.S. Pat. No. 3,835,815, uses a hoist and sling arrangement to restrain a horse within a tank of water. A great deal of bulky machinery is required, in addition to denying the horse any freedom of movement within the tank. Plugge, U.S. Pat. No. 4,047,522 describes a portable hydrotherapeutic apparatus for treating individual limbs of animals, but it is limited in its utility by allowing treatment only of legs of an animal. Its small size also limits its use to one leg at a time, thereby greatly increasing the time needed for treatment. The present invention provides a general therapeutic effect for the entire animal, including muscles in its neck, shoulders and back.

Therefore, it is an object of the present invention to provide an effective and efficient method for placing an animal into a tank or swimming pool while providing a compact structure which is economical to build and operate.

It is a further object of the present invention to provide a hydrotherapeutic apparatus for horses which allows the entire animal to be treated simultaneously.

The present invention utilizes a platform supported over the surface of the water in a tank or pool and level with the ground to allow an animal to be easily led onto the platform. An elevator-type mechanism comprising a motor and cables attached to the platform lowers the animal into the tank or pool. The present invention in one embodiment also includes a hydrotherapeutic tank built below the surface of the ground or floor and large enough to accommodate an animal and in particular a racehorse. The elevator mechanism of the invention lowers the horse into the tank where specially positioned water jets direct water flow onto particular areas of the horse's anatomy. This acts to relax the horse and provide treatment for sore or injured muscles. After a predetermined length of time, the platform is raised and the horse is led off to another area thereby readying the apparatus for use by another horse.

The invention accordingly comprises an apparatus possessing the features, properties, and relation of components which will be exemplified in the elements hereinafter described and the scope of the invention will be indicated in the claims.

For a fuller understanding of the nature and objects of the invention, reference should be had to the following detailed description taken in connection with the accompanying drawings, in which:

DRAWINGS

FIG. 2 is a top plan view of the animal handling system shown in FIG. 1, with parts broken away.

FIG. 3 is a side elevational view of the animal handling system shown in FIG. 1, with parts broken away.

DETAILED DESCRIPTION

Figure 1:
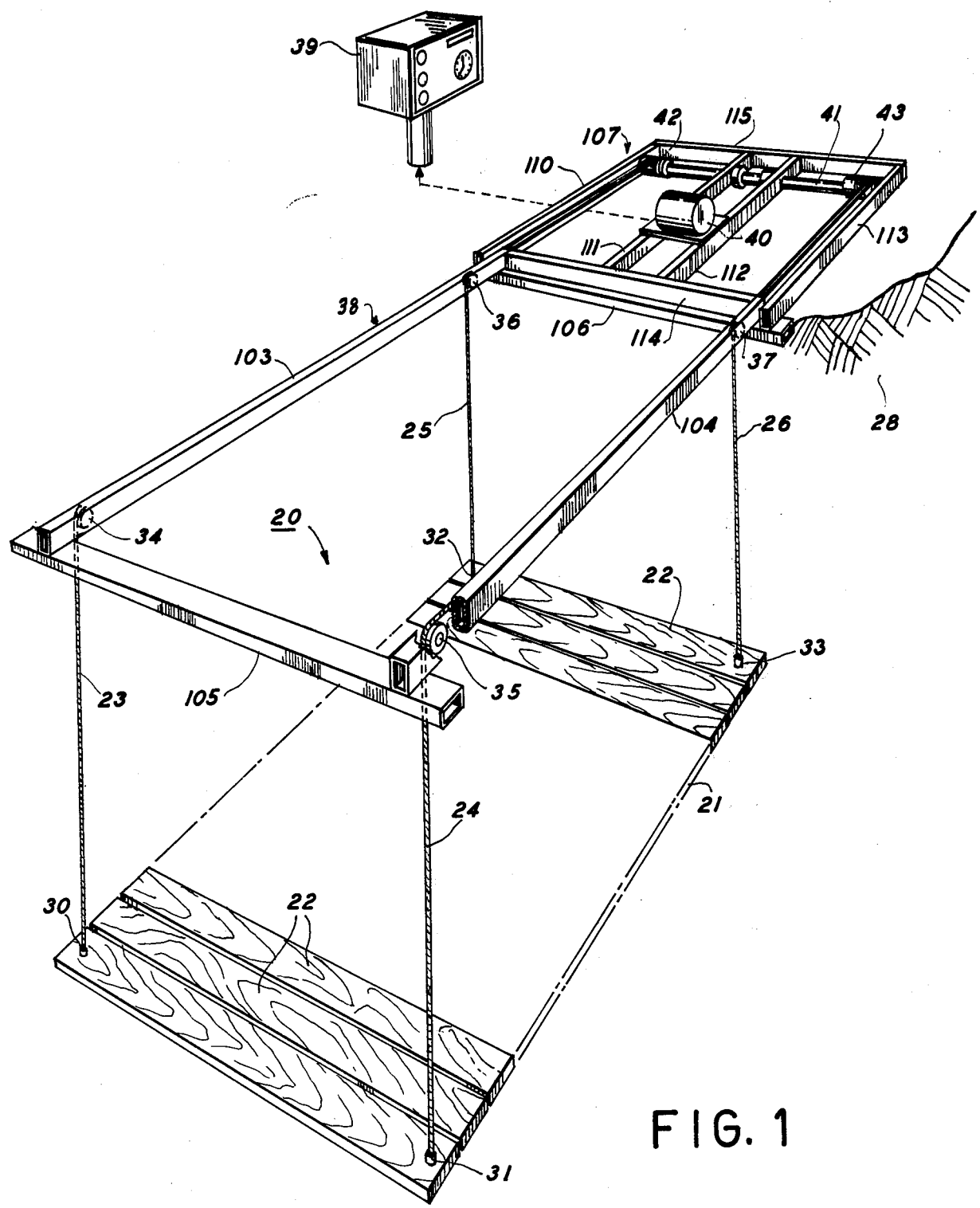
FIG. 1 is a perspective view of an animal handling system with parts broken away.

Referring to FIG. 1, there is shown an elevator system 20 for raising and lowering animals between the surrounding deck or floor 28 and various lower levels. The elevator system 20 comprises a platform 21 consisting of timber planks, generally designated by the numeral 22. The platform 21 is constructed so as to provide spacing between planks 22. The platform 21 is supported by cables 23, 24, 25 and 26, also shown in FIGS. 2 and 3, which are connected to underlying beam 27 preferably of steel forming the base of the platform 21. The cables are anchored to platform 21 at support points 30, 31, 32 and 33, located at the corners of the platform 21.

A support structure 38 comprising longitudinal protective beam members 103 and 104 and transverse beam members 105 and 106 is mounted to the deck or floor 28. A motor support structure 107, comprising similar longitudinal members 110, 111, 112, 113 and transverse beam members 114 and 115 is mounted to the deck or floor 28, at one end of the support structure 38. Pulleys 34 and 35 are disposed within the beam members 103 and 104 respectively at ends removed from the motor support structure 107. Pulleys 36 and 37 are disposed within beam member 103 and 104 at the end adjacent to the motor support structure 107.

The cables 23 and 24 pass over pulleys 34 and 35 and the cables 25 and 26 pass over pulleys 36 and 37. The action of the pulleys 34, 35, 36 and 37 changes the direction of the cable travel and allows the movement of the cables 23, 24, 25 and 26 to all be in a plane parallel to the platform 21. The elevator system 20 also comprises a motor 40 mounted to the motor support structure 107, having a motor shaft 41 upon which are mounted drums 42 and 43. Drum 42 receives cables 23 and 25 and drum 43 receives cables 24 and 26. The support structure 38 also provides support to the platform 21 and houses and protects the cables 23 and 24. A control means 39 is electrically connected to the motor 40 and controls motor operation.

In operation, an animal is led onto the platform 21 from either an upper or lower level. If the platform is at an upper level, the operation of the motor 40 will then act to unwind cables 23 and 25 from the drum 42 and cables 24 and 26 from the drum 43. By action of the pulleys 34, 35, 36 and 37, the longitudinal movement of the cables 23, 24, 25, and 26 is translated from horizontal to vertical motion, and the platform 21 is lowered. Reversal of the motor will cause the shaft 41 to turn in an opposite direction thereby winding the cables onto drums 42 and 43 and hence raising the platform 21. An animal may then be raised or lowered to any number of desired levels and the spacing of the planks 22 of the platform 21 allows the platform 21 to be raised or lowered through any fluid medium, as the fluid medium will circulate between the planks 22 allowing the platform 21 to pass through such a medium easily.

Figure 4:
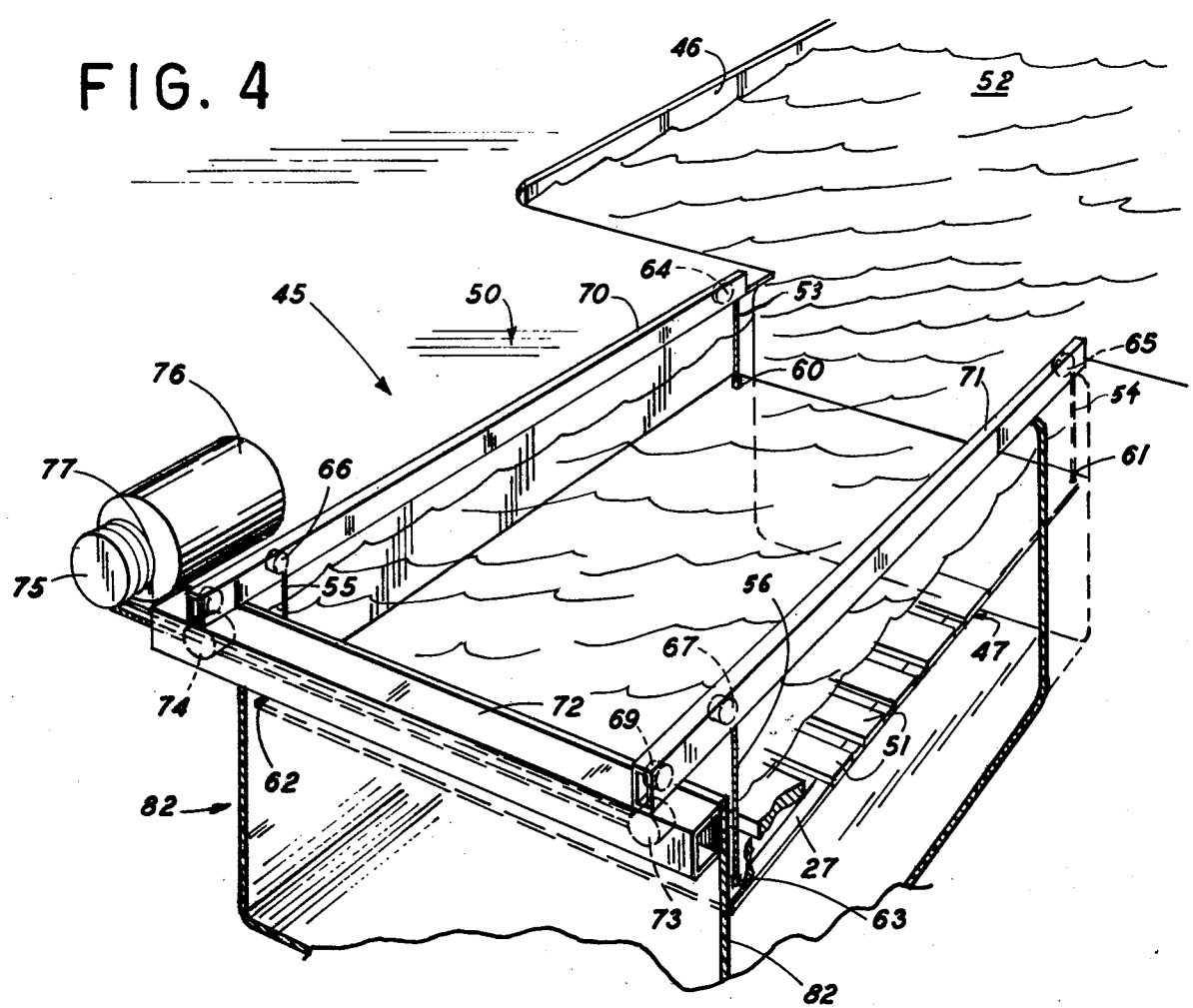
FIG. 4 is a perspective view of an animal handling system similar to that shown in FIG. 1.
Figure 5:
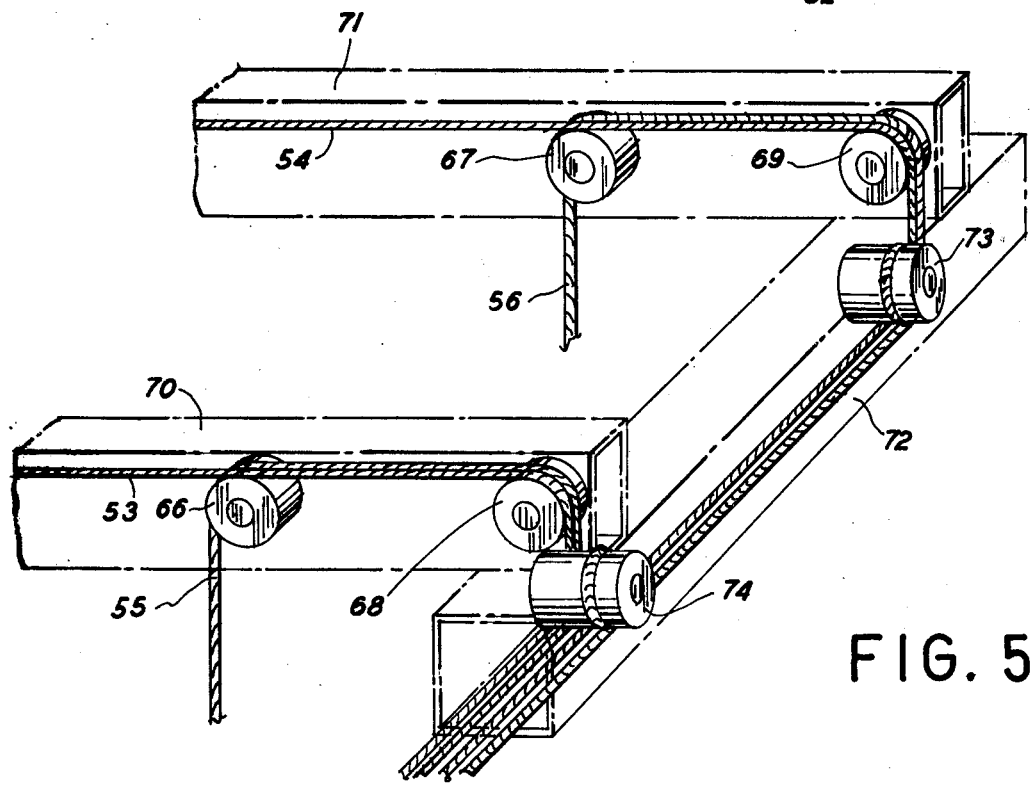
FIG. 5 is an enlarged perspective view of the cable and pulley assembly shown in FIG. 4.

FIGS. 4 and 5 illustrate an elevator system 45 adapted for lowering animals into a pool 46 filled with water or aqueous solution 52. Certain animals, in particular racehorses, are greatly benefited by being able to swim and move about in a pool of water. The elevator system 45 allows an animal or horse to be easily lowered into and removed from a swimming pool without the need for clumsy and costly hoists and slings. The animal elevator system 45 comprises a platform 47 supportably movable between an upper and a lower position. The platform 47 is shown in phantom in FIG. 4. The upper level is substantially equivalent to the level of the surrounding deck area 50, which allows an animal or horse to walk directly onto the platform 47 from the surrounding area 50. The lower level is substantially equivalent to the level of the bottom of the swimming pool 46 allowing the animal or horse to walk off the platform 47.

The platform 47 comprises a series of parallel-spaced wooden planks, generally designated by the numeral 51. The spacing between the planks 51 allows the water 52 in the swimming pool 46 to circulate about the planks 51 of the platform 47 allowing the platform 47 to move easily up and down through the water 52. The platform 47 is supported by cables 53, 54, 55 and 56 which are attached to the platform 47 at support points 60, 61, 62 and 63 located at the four corners of the platform 47. The cables 53, 54, 55 and 56 are typically manufactured of stainless steel having a diameter of approximately 3/16". A rectangular metal tube or box beam 70 preferably having cross-sectional dimensions of approximately two inches by four inches is disposed adjacent to one side of the platform 47 and encloses and protects pulleys 64 and 66 and the cables 53 and 55. An intermediate pulley 68 is also disposed within the tube 70. A similar rectangular metal box beam 71 disposed adjacent to the other side of the platform 47 encloses and protects pulleys 65 and 67 and the cables 54 and 56. An intermediate pulley 69 is also disposed within the tube 71. Pulleys 64, 65, 66, and 67 act to translate the motion of the cables 53, 54, 55 and 56 from a vertical motion to a horizontal motion. A similarly-shaped rectangular metal box beam 72 is recessed below the surface of the deck area 50 at one end of the elevator system 45. This embedded metal box beam 72 houses idler pulleys 73 and 74. The axis of rotation of the idler pulleys 73 and 74 is at right angles to the pulleys 66, 67, 64 and 65. The cable 53 extends from support point 60 of the platform 47 over pulley 64, through beam member 70 over intermediate pulley 68, idler pulley 74 and onto drum 75. The cable 54 extends from support point 61 of the platform 47 over pulleys 65, 69 and idler pulley 73 onto drum 75. Cable 55 extends from support point 62 of platform 47 over pulleys 66 and 68, idler pulley 74 and onto drum 75. Cable 56 similarly extends from support point 63 over pulleys 67 and 69, idler pulley 73 and onto drum 75. This allows the four cables 53, 54, 55 and 56 to be collected at one point and be wound upon drum 75. The drum 75 is driven by the motor 76 by way of the shaft 77. The operation of the motor causes the cables 53, 54, 55 and 56 to be wound or unwound from the drum 75, thereby raising or lowering the platform 47 between its upper and lower positions in the swimming pool 52. The side-mounted position of motor 76 allows endwise ingress and egress for platform 47 from both directions.

Figure 6:
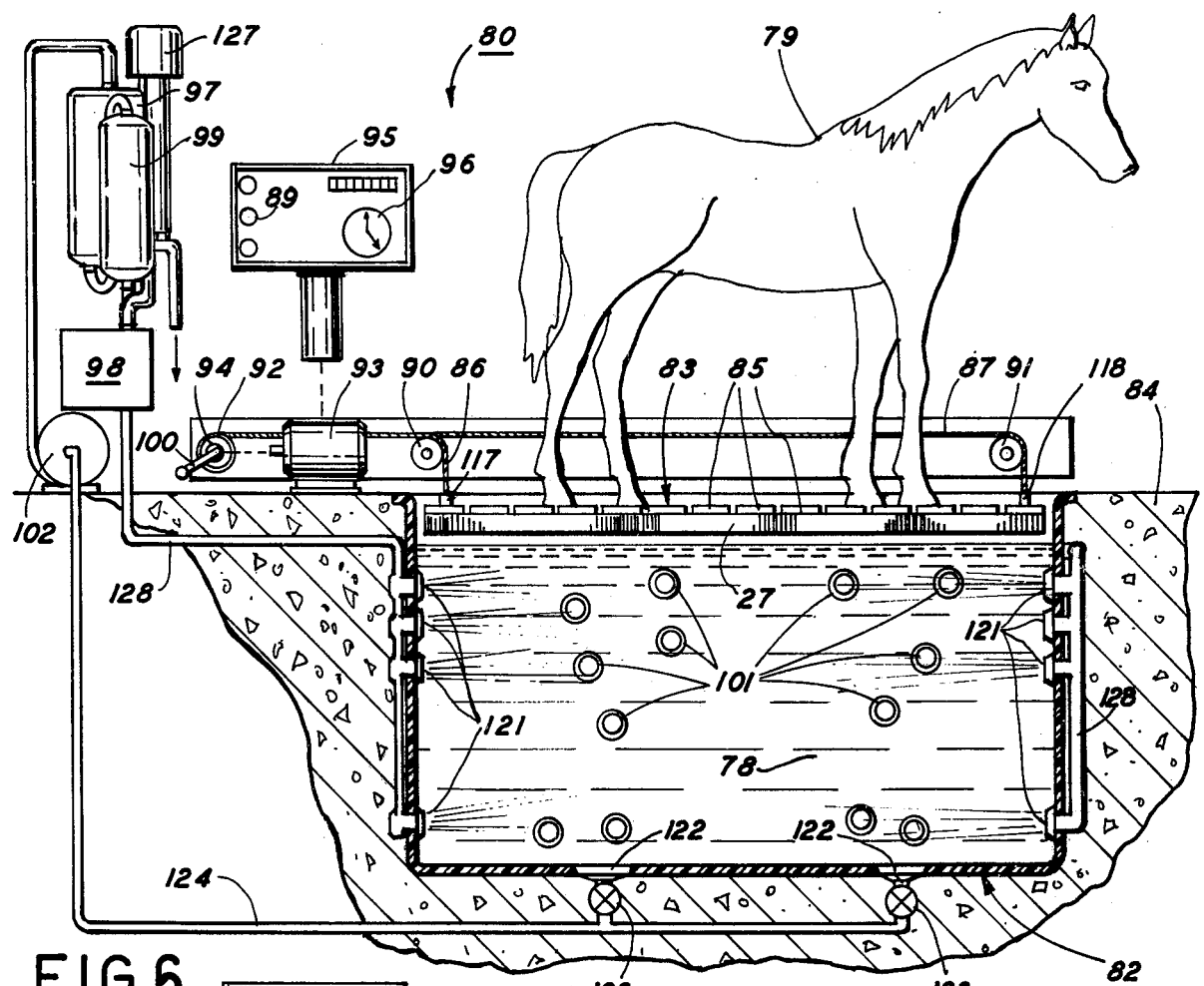
FIG. 6 is a cross-sectional side elevational view of a hydrotherapeutic apparatus for horses, shown in its loading position.

FIG. 6 illustrates a hydrotherapeutic apparatus for horses 80 comprising an animal elevator system similar to that previously described adapted for use in conjunction with a hydrotherapeutic tank 82 filled with water or an aqueous solution 78 of therapeutic salts or the like. The elevator system consists of a planked platform 83 designed to move between an upper and a lower position within the hydrotherapeutic tank 82. The hydrotherapeutic tank 82 is preferably manufactured of fiberglass and is recessed below the surface of the deck or ground 84, thereby allowing the upper level of the platform 83 to be equivalent to the level of the surrounding area 84 to allow a horse 79 to walk directly onto the platform 83. The lower level corresponds to a level substantially equivalent to the bottom of the tank 82. The platform 83 is manufactured of a number of redwood planks spaced a predetermined distance apart to allow water or the aqueous contents 78 of the tank 82 to circulate about the planks when the platform 83 is lowered or raised. The planks are generally designated by the numeral 85. Cables 86 and 87 are attached to the corners of the platform 83 at support points 117 and 118 and act to support the platform 83. Two additional supporting cables, not shown, are attached to the opposite two corners of the platform 83. Similarly positioned pulleys are disposed at the opposite corners of the platform 83. A pulley 90 is disposed over one corner of the platform 83 while pulley 91 is disposed over another corner of platform 83. Pulleys 90 and 91 are mounted to a supporting structure (not shown).

Cable 86 extends from support point 117 of the platform 83 over pulley 90 and is wound onto drum 92. Cable 87 extends from support point 118 of platform 83 over pulley 91 and is wound onto drum 92 in a similar manner. The additional two cables not shown are handled similarly and are also wound onto drum 92. The four supporting cables are wound onto reel 92 which is rotated by the motor 93 through action of the shaft 94. The operation of the motor 93 therefore acts to raise or lower the platform 83 within the hydrotherapeutic tank 82. The control panel 95 which is electrically connected to the motor 93, and acts to control it, contains a timer 96 which is preset to allow the platform 83 to remain submerged within the hydrotherapeutic tank 82 for a predetermined length of time. Manual override control 89 is also provided in order to raise or lower the platform 83 independent of the preset timer 95. Manual crank means 100 are also provided to raise or lower the platform 83 in the event of electrical or motor failures. Control panel 95 preferably also incorporates a counter for recording accumulated therapy time periods, for maintenance and billing purposes.

The hydrotherapeutic tank 82 incorporates a number of hydrotherapeutic jet nozzles generally designated by the numerals 101 and 121. Jet nozzles, such as the "whirlpool inlets" manufactured by Jacuzzi Brothers, Inc. or comparable jet nozzles are suitable for such application. The hydrotherapeutic jet nozzles 101 and 121 work in conjunction with a filter 97 and pump 102 to dispense a pressurized hot water/air mixture which supplies a soothing therapeutic effect to a horse within the tank 82. A rotary separator 99 known as a "mulcher" working on conjunction with the filter 97 and pump 102 removes solid particulate matter and holds it for periodic flushing to maintain the clarity, purity, and sanity quality required for treating a succession of different horses. A heating apparatus 98 such as the Lars Teledyne Oil-Fired Water Heater or a comparable unit is provided to heat the water in tank 82 and to provide the hot water/air mixture to the jet nozzles 101 and 121. Piping 128 connects the jet nozzles 101 and 121 with the heater 98. The hydrotherapeutic jet nozzles 101 and 121 are anatomically positioned about the entire periphery of the tank 82 to provide directed hot water/air flow to particular areas of a horse's anatomy such as muscles and joints to promote circulatory stimulation while avoiding flow to those areas where such massaging action is not beneficial.

Figure 7:
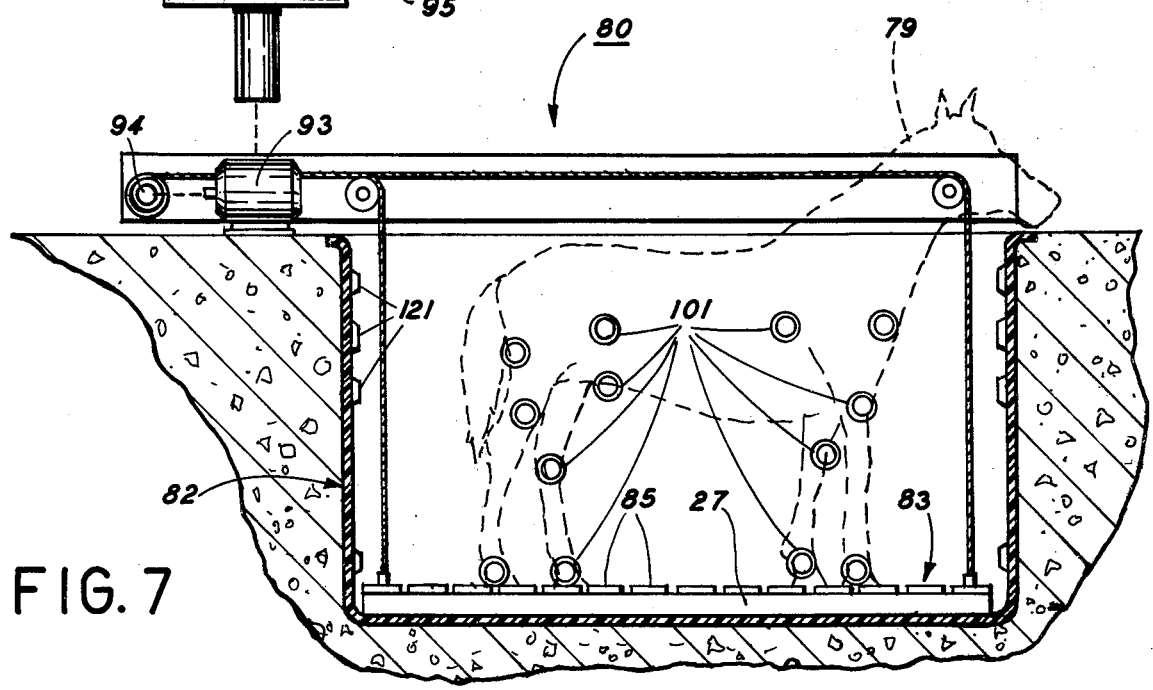
FIG. 7 is a cross-sectional side elevational view of the hydrotherapeutic apparatus for horses shown in FIG. 6, illustrating its operation in its submerged position.

FIG. 7 illustrates the platform 83 in its lower position and the anatomical juxtapositioning of the hydrotherapeutic jet nozzles 101 can be seen in conjunction with the superimposed illustration of the horse 79. Jet nozzles 121 are also provided which direct flow toward the front and back of the horse's anatomy. Preferably the piping delivering the hot water/air mixture to the "whirlpool inlets" will be incorporated into the exterior wall of the tank 82 during fabrication.

In operation, a horse 79 is led onto the platform 83 and through operation of the control panel 95, a treatment cycle is initiated. The motor 93 is operated allowing the cables 86 and 87 and the two additional cables not shown to be unwound from the drum 92. This permits the platform 83 carrying the horse to be lowered into the hydrotherapeutic tank 82. A pump 102 then pumps a mixture of air and water through the jet nozzles 101 and 121 onto the horse's anatomy. The aqueous contents 78 of the tank 82 are removed through drains 122 into a return piping system 124. Hydrostatic check valves 123 prevent back flow of water into the tank 82. The return pipe 124 is connected to a pump 102 which pumps the water 78 through a filter 97 or heater 98 and back to the jet nozzles 101 and 121. An air inlet 127 is connected to the heater 98. The treatment cycle is typically twelve minutes which is thought to provide the horse with sufficient benefits while avoiding unduly prolonged treatment and still allowing for economical operation of the hydrotherapeutic apparatus 80. A timer 96 in the control panel 95 determines the length of the treatment cycle. At its completion, the motor 93 is again operated, and the cables are again wound onto the drum 92 thereby raising the platform 83. The horse 79 is then led off the platform 83 to some other area of the facility thereby readying the hydrotherapeutic apparatus 80 for another horse.

It will thus be seen that the objects set forth above among those made apparent from the preceding description are efficiently attained and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which as a matter of language might be said to fall therebetween.

We claim:

1. An animal handling system for quadrupeds comprising:
   a. a reservatory containing an aqueous solution disposed below ground level for receiving a quadruped for exercise and therapeutic purposes,
   b. a platform movable between an upper, ground level, and an immersed lower level, incorporating a plurality of support points about its periphery,
   c. a stationary support structure disposed substantially at ground level, comprising a plurality of tubular housing means above the periphery of the platform and a plurality of cable-carrying pulleys each disposed within the housing means above one of the platform support points; and
   d. means disposed substantially at ground level for moving the platform between the upper ground level and lower immersed level, comprising:
      (1) a drive means incorporating cable receiving drum means at one end of the platform,
      (2) a plurality of cables, each fixedly mounted at one end to the cable receiving drum means and disposed within the tubular housing means, extending over the cable-carrying pulleys and fixedly mounted to the support points below the cable-carrying pulleys, and
      (3) control means for operating the drive means, whereby a quadruped is supported on the platform while being lowered into and raised from the reservatory.

2. The animal handling system for quadrupeds defined in claim 1, further comprising a hydrotherapy tank containing an aqueous solution disposed below ground level for receiving a quadruped for hydrotherapeutic treatment incorporating a plurality of anatomically juxtaposed hydrotherapy inlet ports disposed about the interior walls of the tank for providing a pressurized mixture of heated water and air.

3. The animal handling system for quadrupeds defined in claim 2, wherein the hydrotherapeutic inlet ports completely encircle a horse positioned in the tank, whereby encircling hydrotherapeutic treatment is administered with minimum dissipation of whirlpool turbulence.

4. The animal handling system for quadrupeds defined in claim 2, wherein the control means incorporates a timer for lowering a quadruped into the tank for a predetermined length of time, and a counter for recording the number of elapsed treatment cycles.

5. The animal handling system for quadrupeds defined in claim 1, wherein the aqueous solution in the tank is chlorinated.

6. The animal handling system for quadrupeds defined in claim 1, wherein the platform comprises a plurality of planks having a predetermined distance between adjacent planks to allow free flow of the aqueous solution between the planks.

7. The animal handling system for quadrupeds defined in claim 1, wherein the stationary drive means is provided with a crank for manual operation.

8. The animal handling system for quadrupeds defined in claim 1, further comprising filter-pump means incorporating a highly efficient solid particle separator for removing particulate matter from the aqueous solution.

9. A hydrotherapeutic apparatus for horses comprising a recessed therapy tank disposed below ground level for receiving a horse incorporating:
  a. hydrotherapeutic inlet ports, disposed at predetermined positions along the interior walls of the tank for providing directed hydrotherapeutic streams, comprising a pressurized mixture of heated water and air,
  b. an aqueous solution disposed within the tank,
  c. heating means for maintaining the aqueous solution in said tank at predetermined temperature,
  d. outlet ports operating in cooperation with filter-pump means and with the hydrotherapeutic inlet ports to maintain a predetermined volume of filtered aqueous solution in said tank,
  e. a horse-carrying platform vertically movable from a loading position above the surface of the aqueous solution in the tank and at a level substantially equivalent to the contiguous ground level to a lowered position supporting the horse immersed in the aqueous solution anatomically juxtaposed to the hydrotherapy ports, said platform incorporating support points spaced about its periphery,
  f. a fixedly mounted support structure disposed substantially at ground level comprising
    (1) enclosure means disposed along opposite sides of the hydrotherapy tank; and
    (2) at least two cable-carrying pulleys disposed within the enclosure means above the platform support points;
  g. means for lowering the platform into the tank and maintaining a horse on the platform in anatomical juxtaposed position with the hydrotherapeutic inlet ports during a hydrotherapeutic treatment, and then raising the platform from the tank, comprising:
    (1) a stationary drive means disposed substantially at ground level at one end of the platform and incorporating drum means disposed above the platform support points,
    (2) one pair of cable means each fixedly mounted at one end to the drum means and at the other end fixedly mounted to the platform support points; and
    (3) a second pair of cable means, each fixedly mounted at one end to the drum means, extending through the enclosure means along opposite sides of the hydrotherapy tank and supported by the cable-carrying pulleys within the enclosure means, and at the other end fixedly mounted to the platform support points below the pulleys.

10. The hydrotherapeutic apparatus for horses defined in claim 9, wherein the filter-pump means incorporates a highly efficient particle separator for removing solid material from the aqueous solution in the tank.

11. The hydrotherapeutic apparatus for horses defined in claim 9, wherein the aqueous solution in the tank is chlorinated.

12. A hydrotherapeutic apparatus for horses comprising:
  a. a therapy tank containing an aqueous solution disposed below ground level incorporating hydrotherapeutic inlet ports for delivering a pressurized stream comprising heated water and air disposed at predetermined anatomically juxtaposed positions along all peripheral walls of the tank for providing completely encircling anatomical hydrotherapeutic treatment,
  b. heating means for maintaining the aqueous solution in the tank at a predetermined temperature,
  c. outlt ports operating in cooperation with a filter-pump means and with the hydrotherapeutic inlet ports to maintain a predetermined volume of filtered aqueous solution in the tank,
  d. means disposed substantially at ground level for alternately lowering a horse into the tank to a level anatomically juxtaposed with the hydrotherapeutic inlet ports, and raising the horse from the tank comprising:
    (1) a horse-carrying platform having a plurality of support points disposed about its periphery and movable between an upper ground level, and a lower immersed level within the tank,
    (2) a stationary ground level support structure incorporating a plurality of enclosure means with a plurality of cable-carrying pulleys disposed within the enclosure means, each disposed over one of the platform support points,
    (3) drive means incorporating cable-receiving drum means at one end f the platform,
    (4) a plurality of cables, each fixedly mounted at one end to the cable-receiving drum means and extending through the enclosure means, passing over and supported by the cable-carrying pulleys, and fixedly mounted at the other end to the platform support points, and
    (5) control means for operating the drive means,
  whereby a horse is lowered into the tank to receive a completely encircling hydrotherapeutic treatment.

* * * * *